(12) United States Patent
Kanstad

(10) Patent No.: US 6,540,690 B1
(45) Date of Patent: Apr. 1, 2003

(54) INFRARED RADIATION SOURCE AND ITS APPLICATION FOR GAS MEASUREMENT

(75) Inventor: Svein Otto Kanstad, Volda (NO)

(73) Assignee: Kanstad Teknologi AS, Volda (NO)

( * ) Notice: Subject to any disclaimer, the term of this patent is extended or adjusted under 35 U.S.C. 154(b) by 0 days.

(21) Appl. No.: 09/743,866

(22) PCT Filed: Jul. 19, 1999

(86) PCT No.: PCT/NO99/00240

§ 371 (c)(1),
(2), (4) Date: Jan. 17, 2001

(87) PCT Pub. No.: WO00/04351

PCT Pub. Date: Jan. 27, 2000

(30) Foreign Application Priority Data

Jul. 17, 1998 (NO) .......................... 19983335

(51) Int. Cl.[7] ............... A61B 5/08; G01J 1/00
(52) U.S. Cl. ..................... 600/532; 250/504 R
(58) Field of Search ................. 600/532, 310, 600/300, 529; 250/504 R, 504 A, 493.1, 495.1

(56) References Cited

U.S. PATENT DOCUMENTS

| | | |
|---|---|---|
| 4,620,104 A | 10/1986 | Nordal et al. |
| 4,644,141 A | 2/1987 | Hagen et al. |
| 4,859,859 A | 8/1989 | Knodle et al. |
| 5,092,342 A * | 3/1992 | Hattendorff et al. ........ 600/532 |
| 5,220,173 A | 6/1993 | Kanstad |
| 5,261,415 A * | 11/1993 | Dussault ..................... 600/532 |
| 5,324,951 A | 6/1994 | Kocache et al. |
| 5,369,277 A | 11/1994 | Knodle et al. |
| 5,445,160 A * | 8/1995 | Culver et al. ............... 600/532 |
| 5,567,951 A | 10/1996 | Baschant et al. |
| 5,838,016 A | 11/1998 | Johnson |
| 5,864,144 A * | 1/1999 | Laine ..................... 250/504 R |
| 6,325,978 B1 * | 12/2001 | Labuda et al. ................ 422/84 |

FOREIGN PATENT DOCUMENTS

| | | |
|---|---|---|
| EP | 0 720 730 | 6/1996 |
| EP | 0 859 536 | 8/1998 |
| WO | 95 08755 | 3/1995 |
| WO | 96 12165 | 4/1996 |
| WO | 97 04623 | 2/1997 |
| WO | 97 09593 | 3/1997 |

OTHER PUBLICATIONS

D.C. Laine et al., "Pulsed wideband IR thermal source", *IEE Proc–Optpelectron*, vol. 144, No. 5, pp. 315–322.

\* cited by examiner

*Primary Examiner*—Teresa Walberg
*Assistant Examiner*—Daniel Robinson
(74) *Attorney, Agent, or Firm*—Browdy and Neimark, P.L.L.C.

(57) ABSTRACT

Electrically pulsed infrared radiation source made from a thin foil-shaped material, which may be operated as required with temperature amplitudes of 100 K or more at millisecond pulse lengths. The source may be manufactured from known materials, and may be mounted in a preferred design as a curve-shaped bridge between two fixtures. The radiation source is particularly well adapted to be used in connection with pulse based methods and sensors for identification, measurement and warning of gas occurrences by means of infrared radiation. Examples of such methods and sensors are included in the invention.

12 Claims, 2 Drawing Sheets

INFRARED RADIATION SOURCE AND ITS APPLICATION FOR GAS MEASUREMENT

Figure 1:
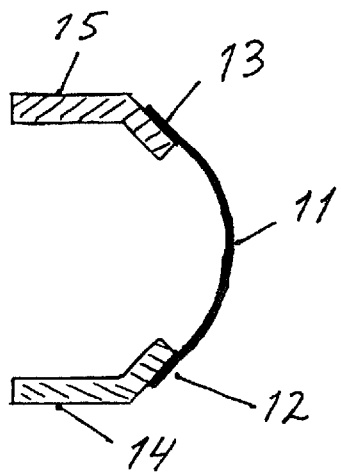

The present application is the national stage under 35 U.S.C. 371 of PCT/NO99/00240 filed Jul. 19, 1999 which designated the United States, and was published in English as WO 00/04351.

This invention concerns electrically pulsed infrared radiation sources, and discloses how, with simple means, one may specify and improve their performance far beyond what is possible in the prior art. This shall offer considerable advantages when utilizing such radiation sources in connection with gas sensors in particular, which by using infrared radiation sources according to the invention may be made better, simpler and less expensive compared to what has been possible earlier.

Infrared (IR) sensors for gas comprise both IR sources and IR detectors. IR detectors normally react only on changes in IR radiation. In connection with technical measurements this is traditionally established by pulsing the radiation by means of a so-called "chopper", a rotating wheel with holes that chop the radiation from a constant (CW) source. This generates large temperature amplitudes between the hot source and the cold chopper blade, as seen from the IR detector. The radiation pulses may then be exactly calculated, because the temperatures will be known both for the IR source and the chopper blade. However, the pulses are locked onto one given frequency only, and the technique depends on expensive, inflexible and often delicate equipment with moving parts that are not adapted to modern electronic technology. During the 80's such chopped sources were to a large extent replaced by sources that could be electrically modulated, in which cases the source becomes heated by means of electrical pulses and is cooled by heat conduction into the immediate surroundings of the source. Only weak modulations of the source's temperature may hereby be achieved, however, with amplitudes of the order of 1–10 K. As seen from the detector, the IR signals then become considerably weaker, with corresponding loss of sensitivity and resolution in technical measurements. Moreover, because the physical conditions concerning the heating and cooling of the source are in such cases not well defined, it also becomes difficult in advance to calculate—and to design the source for—the strength of the resulting IR signals.

IR detectors convert the IR signal into electrical signals with detector-specific responsivities R[V/W]. Next the electrical signals are subject to standard electronic amplification and signal treatment. The IR signal increases with the strength of the IR pulses. Therefore, large temperature amplitudes $\Delta T$ for the source are essential. The measurements, however, are limited by noise, too, which is chiefly caused by the detector. In this respect, IR detectors are defined by their "Noise-Equivalent-Power", NEP, which increases with the square root of the electrical bandwidth $\Delta f$ of the signal electronics; $NEP \sim (\Delta f)^{1/2}$. In the most commonly used IR detectors, it is also the case that the noise increases in inverse proportion with the frequency at low frequencies, so-called 1/f noise, and only reaches a constant, low level at frequencies typically exceeding 500–1,000 Hz. When using chopped IR sources, this is solved by chopping at sufficiently high pulse rates, often of the order of 1,000 Hz or more. With electrically modulated IR sources, however, that is not possible, because the modulation frequencies will be limited to ca 100 Hz, and even then with temperature amplitudes of the order of 1 K only. This results in small IR signals and large 1/f noise in existing, electrically modulated IR sensors.

The quality of an IR measurement is given by the signal-to-noise ratio S/N, which to good measure will be proportional to $\Delta T$ and inversely proportional to $(\Delta f)^{1/2}$; i.e., $S/N \sim \Delta T/(\Delta f)^{1/2}$. Given $\Delta T$ and $\Delta f$, the properties of the sensor thus may be calculated rather exactly as a basis for its constructional making, design and manufacture. Within existing techniques one attempts to increase S/N by employing a small electric bandwidth in the measurement. This is made by including a narrow-band electronic filter into the detector electronics, that will pass electrical signals inside a very limited frequency band $\Delta f$ only near the chosen pulse frequency $f$. For sensors with chopped IR sources—and for modulated IR sources in particular where the frequency is lower and the 1/f noise from the detector is higher and the bandwidth therefore has to be further narrowed—this in both cases implies that every single measurement shall take a long time, from seconds up to several minutes. Temporal resolution for time varying signals thus becomes inferior. Moreover, the measurements are carried out in continuous sequence, the sources are on all the time and draw a lot of current. Added to the long time constants these are further deficiencies suffered by existing IR gas sensors.

U.S. Pat. No. 5,220,173 opens for a possible solution to those problems, through its disclosure of an electrically pulsed thermal IR source which is cooled by thermal radiation between the pulses. Radiation-cooled IR sources may achieve temperature variations of the order of 100 K or more, with correspondingly strong IR pulses. The possibility then also exists to perform measurements by means of single pulses at chosen times, with the source turned off in between pulses. This may afford good temporal resolution and low current loads, with IR signals that approach those obtained with choppers. Said U.S. Patent, however, only provides the necessary conditions for the manufacture of a pulsed, radiation-cooled thermal IR source. The patent gives no answer as to how one may achieve temperature amplitudes of prescribed, preferred magnitudes, nor does it give any advice on which pulse lengths may be used. Such information is vital in order to produce IR sources whose performance and yield are determined from the requirements set by concrete applications, for example, when making real IR sensors which are optimized in relation to signal strength, temporal resolution, S/N ratio etc for a given technical measurement task.

The present invention takes as its starting point the said U.S. Pat. No. 5,220,173, and teaches how one may produce IR sources with powerful and entirely specified single IR pulses. Suppose that the IR source is made from an electrically conductive foil shaped material, and that it radiates from a higher temperature $T_m$ which is maintained for a certain element of time, subject to excitation by a pulse of electric current from a suitable electric drive circuit. Normally the temperature is set depending on the spectral region which the source is to cover, often $T_m$ may be found in the region 800–1,000 K. According to Planck's law, the source then radiates with a power $P = \epsilon \sigma T_m^4$ per unit square, where $\epsilon < 1$ is the emissivity of the source surface and $\sigma = 5{,}67 \cdot 10^{-12}$ $Wcm^{-2}K^{-4}$ is the Stefan-Boltzmann constant. Compared with the radiation given off, the source receives little radiation in return from its surroundings, which are closer to room temperature. Likewise, suppose that the measurement task requires IR pulses of duration $\theta$. With surface area A, and assuming that the source radiates equally to both sides, the IR source shall give off a net amount of radiative energy during the pulse that is, to good approximation, given by $$E_r = 2A\epsilon\sigma\theta T_m^4. \tag{1}$$

When the current pulse is switched off, the source supposedly becomes rapidly cooled by a large, predetermined temperature amplitude ΔT to a lower temperature $T_o$, to produce a preferred magnitude of the IR signals. For the present IR sources according to the invention, such cooling occurs by means of thermal radiation, according to the said U.S. Pat. No. 5,220,173. The foil shaped material is assumed to have thickness d. Cooling the source across a temperature interval ΔT from $T_m$ to $T_o$ then requires that an amount of thermal energy $E_z$ be removed from the source, where $$E_s = CAd\rho\Delta T, \quad (2)$$

in which ρ is the density and C is the specific thermal capacity of the source material. A corresponding amount of energy must be supplied by the following current pulse in the form of electrical energy, in order to raise the source temperature from $T_o$ back to $T_m$. For the IR source to satisfy the requirements of radiation cooling, according to the said U.S. Patent, the source must be made so as to make $E_r > E_s$. From this follows by simple calculation starting with (1) and (2), that the IR source must be made from a material with thickness d that obeys the relation $$d < 2\epsilon\sigma\theta T_m^4 / C\rho\Delta T. \quad (3)$$

Relation (3) discloses how pulsed, radiation-cooled IR sources must be made in order to make temperature amplitudes of ΔT dimension feasible at pulse lengths θ. The necessary and sufficient physical requirements and conditions for producing radiation-cooled, pulsed IR sources thus are determined by those combinations of temperature amplitudes and pulse lengths which the sources are to produce. Relation (3) is new and entirely general, and is valid for any areal shape and size of the source, because all parts of the source surface are locally cooled by thermal radiation transversely to the surface and independently of heat conduction along the surface. When made according to relation (3), therefore, IR sources with large emitting surfaces may be pulsed as rapidly and as often as small sources; with previous, conduction-cooled sources this could not be done. Relation (3) enters into claim 1 as the characterizing feature of the present invention. According to claim 1, the source may also be formed in such a way that the foil shaped material is either heated in its entirety, or that only certain parts of the source become heated to the actual temperatures; in any case it is the thickness of those parts of the source which are to be heated to the temperature $T_m$ that occurs in relation (3) and in the corresponding expression in claim 1.

Claim 1 opens up for the manufacture of electrically pulsed IR sources which satisfy stated, preferred technical data and specifications, in a manner similar to IR detectors and other modern optical and electronic components and products. Next, this makes it possible to develop simple and inexpensive pulsed IR sensors that are adapted to particular applications, and whose performance may be calculated and specified even in the design phase. Such sensors by themselves represent a considerable novelty as compared with the prior art. The challenge will be to manufacture, to an industrial scale, such IR sources that can withstand those large thermal and mechanical strains which may arise, when they become subjected to frequent, repeated temperature excursions of 100 K or more. For most materials, this may bring about fracture due to buckling. As another problem, the source may twist and bend as a result of heating, which produces an unstable source with shifting IR illumination of the IR detector. The invention has as its aim to provide solutions for all such tasks and problems, by creating a technological platform for industrial manufacture of improved IR sources, both as special, self-contained products and as essential, specified components in equipment that employs the source and its qualities in new and advanced methods and sensors for IR measurements of gas.

Figure 2:
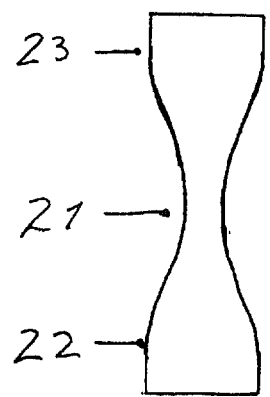
Figure 3:
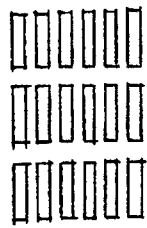
Figure 4:
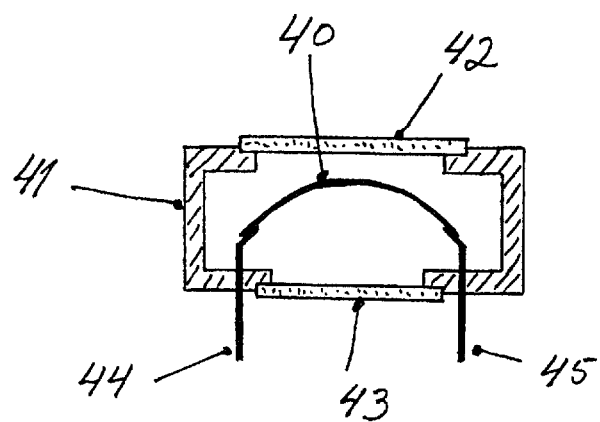
Figure 5:
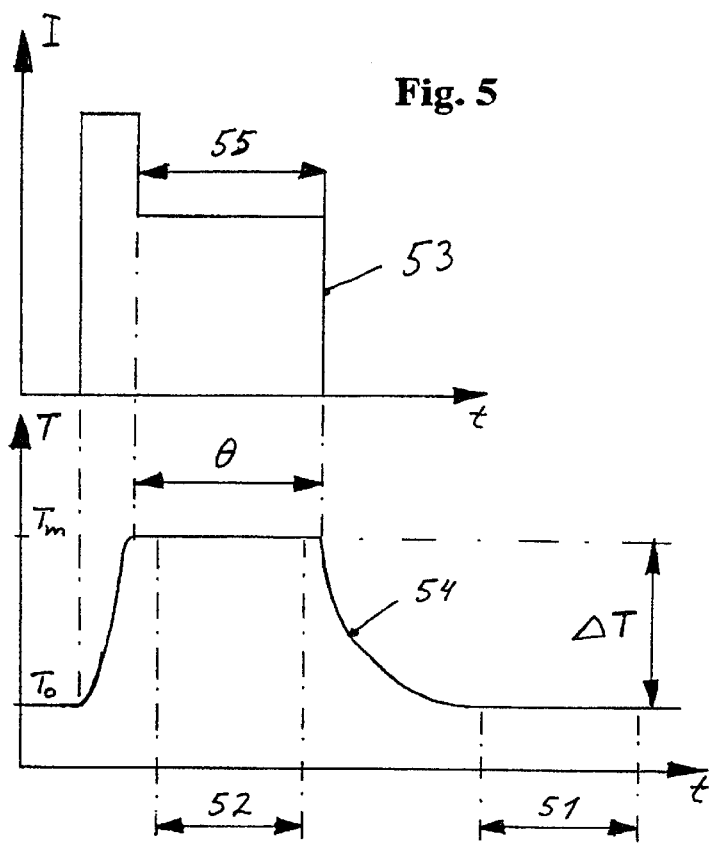
Figure 7:
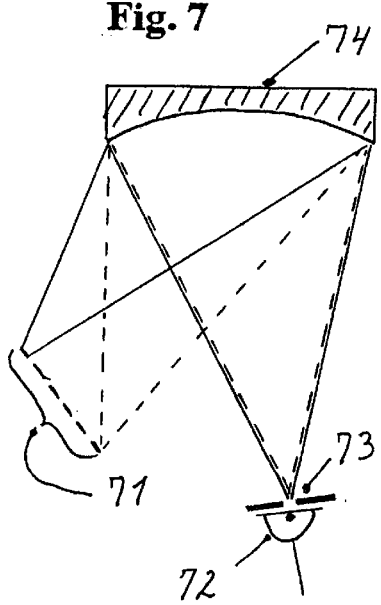
Figure 6:
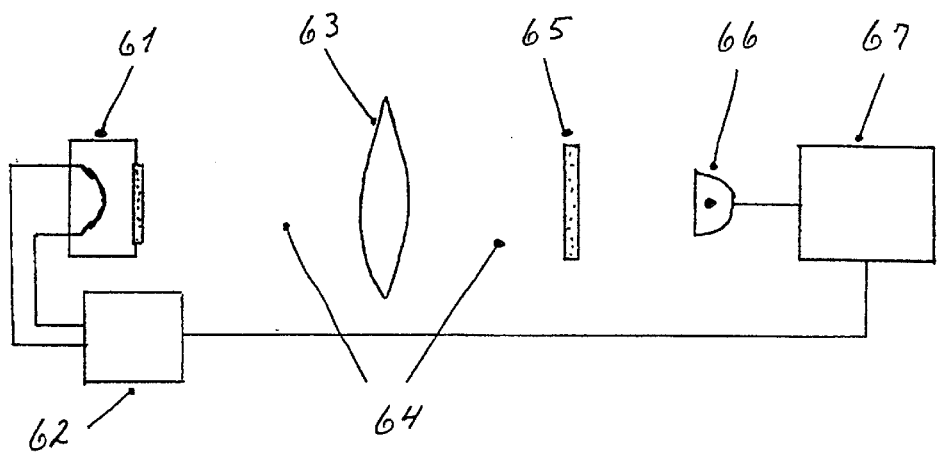

Below, the invention is to be more closely presented and described, by means of references to and comments on the patent claims and by referring, in particular, to the figures, in which all shapes and dimensions may be distorted in the interest of illustrating a point, and where FIG. 1 shows a preferred mounting of the IR source FIG. 2 shows a preferred shape of the IR source FIG. 3 shows a joint mounting of several IR sources FIG. 4 shows an example of an encapsulated IR source FIG. 5 shows a preferred pulse of current with the resulting IR pulse FIG. 6 shows in principle the design of an IR gas sensor FIG. 7 shows the use of two or more IR sources with a spectrally dispersive element.

A deeper insight into the invention may be reached by examining claim 1 in more detail. The crucial feature is the relation—identical with (3)—which imposes an upper limit on the thickness of the foil shaped material of the source element, in order for the IR source to be produced in accordance with the specifications that are required in regard to technical performance. The said relation includes the material parameters ε, C and ρ, which most often allow only limited latitude; ε is chosen to be as high as practically possible in each case, normally a value between 0.5 and 1, and the product Cρ for most regular materials has a value in the range 2–4 $JK^{-1}$ $cm^{-3}$. For IR gas measurements, the emission temperature may be around 1,000 K, which produces a broad thermal spectrum from the source with a maximum near 3 μm wavelength and well suited for the spectra of most relevant gases. With $T_m$=1,000 K, C·ρ=3 $JK^{-1}$ $cm^{-3}$ and ε=0.8 as typical values, the requirement on the IR source thickness thus may be expressed as $$d < 3\theta/\Delta T [cm]. \quad (4)$$

In many practical situations this relation will be valid within a factor of 2. It provides a starting point to set the specifications for a desired source. For instance, if temperature amplitudes of 100 K and pulse lengths of 10 ms are desired, the source must be made, according to relation (4), from a material thinner than about 3 μm. This hints at the dimensions in question. For many materials, such thicknesses approach the limit of what may be technically feasible, because substantially thinner foils may have difficulties in supporting themselves.

Likewise, if the actual applications of the IR source might require temperature amplitudes of 500 K magnitude, the pulse length, too, will have to be increased, to 50 ms or more. Thus, high temporal resolution and large IR signals cannot be combined without further measure. However, limits on the pulse length are set not only by the requirements of time resolution. In order to describe a pulse of duration θ, a frequency spectrum is required whose width Δf is, to good approximation, given by Δf=2π/θ. Therefore, the detector electronics must have at least this electrical bandwidth. The frequency spectrum Δf determines the width of the noise spectrum in the measurements. In other words, the noise shall increase inversely with the square root of the pulse length, NEP~$(\Delta f)^{1/2}$~$(\theta)^{-1/2}$, to make the S/N-relation vary as S/N~$\Delta T \cdot (\theta)^{1/2}$. Thus, as far as noise is concerned long pulses as well as large IR signals are advantageous, because both factors contribute to increasing the S/N ratio. For exact measurements of low gas densities, therefore, one must emphasize the use of long pulses, at the expense of high time resolution. This implies that, in practical circumstances, the particular applications which the IR source is to serve need to be taken into account when, from claim 1, one sets the requirements and specifications for its design and manufacture. As was shown, quite often one may have to make a compromise between diverging factors.

FIG. 1 depicts an IR source as mounted with its ends onto two fastening arrangements 14 and 15,—which may also serve as electrical contacts—, in such a way that the end surfaces of the source make an angle with each other as seen from the side. The source then shall be standing as a curve-shaped bridge between the fixtures. Such a mounting solves the problem of breakage due to buckling when the source becomes repetitively heated and cooled with large temperature amplitudes. Advantageously, the source may be mounted so as to make the freely suspended part of the curve lie wholly inside the corresponding circular sector whose tangents coincide with those of the source at the fixture contacts, however, without making any abrupt changes in curvature. The fastening arrangements ought to be fixed in space, and the source should be permanently and solidly attached to those, e.g., by the use of screws, squeezing, welding or similar means. This also avoids that the source may bend and twist during a pulse of current. The source's reaction upon the heating will then be limited to microscopic movements of its middle parts, back and forth in axial direction facing the detector. This takes place without any mechanical stress being induced in the material. As seen from the detector, the source constitutes a geometrically and postionally stable shape, with a radiation lobe that does not change during the pulse. This solution has been advanced in claims 2 and 3, in which claim 3 discloses that a favourable angle between the fixture surfaces may be found in the range 60°–120°.

In order to locate the heating to a preferred part of the source, most often near the middle of its length extension, the source may be given a weakly tapering shape towards the centre of the hot region. Thereby the thermal emission shall be permanently concentrated to a predetermined part of the source, shown as item 21 in FIG. 2. Outside of this region, the width may be constant, or it may widen into two broader ends 22 and 23 as is also shown in FIG. 2. Both alternatives are contained in claim 4. Since the local electrical heating decreases with the square of the width, a solution as illustrated in the said figure also serves to reduce heat losses caused by thermal conduction into the fixtures. Moreover, the mechanical position of the source becomes further stabilised. Similar localization of the heating, with possible reduction of conductive heat losses, too, may be obtained by making the source's thickness vary in a corresponding manner towards that region where the heat is chiefly to be deposited, as disclosed in claim 5. The designs of claims 4 and 5 may also be combined into one and the same source element. In an industrial context, the shaping of the source may preferably be made through die cutting, etching or other cold working.

In many applications it may be desireable to have several IR sources mounted closely together, either in a row or in a two-dimensional matrix, as illustrated in FIG. 3 and disclosed in claim 6. Electrically these may then be coupled so as to make two or more source elements be simultaneously excited, e.g., to assemble a particularly large and powerful IR source. Alternatively, the source elements may also be coupled in such a way that one or more elements are excited independently of other elements, for instance, in time multiplexing of different spectral IR pulses, or in order to simulate a thermally variable scene or picture. Such embodiments of claim 6 are disclosed in claims 7 and 8.

Claims 9–13 disclose a selection of different materials that may be used for making the IR source. Certain metals, alloys and metallic glasses as disclosed in claim 9 exist industrially as rolled foils in micron ticknesses. For example, several nickel-chromium-iron based alloys are made to be used in extreme thermal environments, and often have high emissivities in their natural state. As with metallic glasses, many ceramic materials, too, may be made with predetermined electrical conductivities. Ceramics may be deposited from liquid phase into preferred shapes and thicknesses, which may be exploited to make IR sources according to claim 10. In addition, IR sources made from semiconductor materials according to claim 11 may be an obvious choice, particularly silicon but others, too, which let themselves to doping and treatments with etching and other techniques into preferred shapes etc. Moreover, carbon based chemistry is rapidly developing, with new kinds of materials comprising fullerenes as well as carbon-based, diamond-type networks and other formats that may be used for making IR sources as disclosed in claim 12. Porous materials as disclosed in claim 13 represent a special alternative, because low density (i.e., small $\rho$) and large mechanical strength per square weight may allow shorter IR pulses to be obtained than can be had with homogeneous materials, for similar temperature amplitudes and physical thicknesses. Altogether the disclosed materials constitute a broad selection, each of which materials may offer different advantages for the manufacture of IR sources according to the invention.

Several of the disclosed materials, however, may have low emissivities in their natural state. High emissivity is important to obtain fast and powerful radiative cooling and strong IR signals. Thus, the emissivity $\epsilon$ enters into the characterizing relation of claim 1. By applying a microscopic depth structure—a "texture"—to the surface of the source material, as disclosed in claim 14, the emissivity may be improved to reach nearly its theoretically maximum value. To this end a multitude of established industrial methods exist, such as, for example, chemical etching and ion/plasma treatment in vacuo, which may to some extent also be arranged to impart a systematic shape to the texture to obtain special effects.

With regard to the stability and reproducibility of the IR source over time, it may be advantageous to keep the source in an hermetically sealed encapsulation, which has been either evacuated or else by other means made devoid of reactive gases. Efficient radiative cooling requires that the source be able to dispose of its heat, by radiating as freely as possible to both sides. Often one may also wish to employ signals from the front as well as the rear side of the source. FIG. 4 shows an example of an IR source 40 mounted in an encapsulation 41 with two windows 42 and 43, and with electrical feed-throughs 44 and 45 for the supply of electrical current to the source. This solution is disclosed in claim 15, comprising an encapsulation with IR transparent windows adapted to at least one of opposite faces of the source. Another solution is disclosed in claim 16, in which the encapsulation has a bulb- or cylinder-like shape made from IR transmitting glass or other IR transparent material, with remaining remedies as in claim 15. Variants of different solutions may also be practicable.

The IR pulses in question consist of three distinct phases: A heating phase, an emission phase and a cooling phase. In order to achieve well-defined IR pulses, it is preferable to make the source heat rapidly to its operating temperature for each pulse. This may be obtained by the use of current pulses with a first part that carries a high current, and whose energy contents at least matches $E_s$ of equation (2) above; indeed, if the heating and cooling phases are approximately of equal duration, this initial part of the current pulse actually must contain an amount of energy quite close to $2 E_s$. The first part of the current pulse is adjusted to bring the source to its operating temperature $T_m$. Thereafter, the current is reduced to a constant, lower level which serves to maintain the operating temperature. This solution is disclosed in claim 17. FIG. 5 shows an example of such a preferred current pulse 53, and the resulting temperature history 54 of the source. The duration 55 of the constant level of the current pulse is adapted to the desired length θ of the IR pulse. Since the source does not become further heated during the emission phase, essentially all electrical energy that is supplied to the source in this phase becomes radiated off as thermal energy. This secures a high energy efficiency. When the current pulse is switched off, the thermal energy that was stored in the source during the heating phase, becomes quickly removed by continued radiation, which produces a short cooling phase with strong initial cooling that weakens as the temperature keeps falling.

Claim 18 discloses a method for pulse-wise identification, measurement and/or warning of gas by means of one or more IR sources according to the invention. The method is distinct from similar methods that are applied in prior-art IR sensors, in that the measurements are made in a pulse-wise manner using a pulsed IR source which has been produced in accordance with the present invention. This imposes certain limitations on the pulse lengths that may be used in the method. FIG. 6 shows how the method is in principle carried out, by means of an IR source 61 that is excited by an electrical drive circuit 62, and where the IR radiation is guided via an optical element 63 through an open or enclosed volume of gas 64 and a spectrally selective element 65 onto an IR detector 66, followed by electronic equipment 67' for the amplification, treatment and/or presentation of the resulting signals. The order of the individual components in FIG. 6 is insignificant and may be changed as desired. When practising the method, one may then have at one's disposal, among others, an IR source that has been manufactured according to claim 1 from a material with given values of C, ρ and ε, and which is characterized by an actual and concrete thickness $d_o$ as one of its crucial specifications.

In the first place, the method will be characterized by deciding on a temperature $T_m$ and a temperature amplitude $\Delta T_1$ at which the source is to be operated. For good single-pulse measurements to obtain, $\Delta T_1$ should preferentially be chosen to be larger than 100 K. Secondly, and inherent to the method, it must be decided which pulse lengths $\theta_1$ may be used for those measurements that the method is to perform. By means of relation (3), one finds that the relevant pulse lengths have to satisfy the relation $$\theta_1 > (C\rho d_0 / 2\epsilon\sigma T_m^4)\Delta T_1. \quad (5)$$

Consequently, and according to claim 18, the method is characterized by being practised with those pulse lengths $\theta_1$ which, for the actual, existing IR source at hand and in accordance with relation (5), may at all be allowed for radiation-cooled IR sources that are manufactured according to the invention and with the chosen values for the temperature $T_m$ and the temperature amplitude $\Delta T_1$ of the IR source. However, if the pulse lengths $\theta_1$ that result from this are initially too long, compared to the time resolution that has been set for the measurements, an optimization has to be made by choosing other values for $T_m$ and/or $\Delta T_1$, to the extent that such is compatible with the technical parameters and specifications for the actual materials and measurements. This may be achieved through an iterative process, until a new value for the pulse length $\theta_1$ has been established, that is sufficiently short and which still satisfies relation (5), however, with adjusted values for $T_m$ and/or $\Delta T_1$ as compared to the starting point. As explained above, when commenting on claim 1, the price to be paid for such an optimization in the direction of shorter $\theta_1$, and where $\Delta T_1$ remains constant or has to be reduced, is that the electronic noise in the measurements is due to increase.

Claim 19 specifies the method even further. With reference to FIG. 5, this happens through a summation of the electrical signals from the IR detector, inside an interval of time 51 called $\Gamma_1$ when the source radiates from the lower temperature level $T_o$, and inside a similar time interval 52 called $\Gamma_2$ and which is less than or equal to the pulse length $\theta_1$, when the IR source radiates from the higher temperature level $T_m$. In the technical literature, such a measurment technique that operates inside given time intervals is termed "box-car integration". The method is complementary to that which is used in existing IR sensors, where signals are summed along a frequency axis and inside a given frequency interval at a certain modulation or chop frequency, whereas in the method according to claim 19 signals are summed inside a given time interval along a time axis. The difference in summed signals between the two time intervals is used as a measure of the amount of pulse-wise IR radiation which illuminates the actual IR detector, in analogy with what is otherwise common technology. In order to reduce the noise it may be an advantage to make $\Gamma_1$ as large as possible, within the limits that are set by the temporal development between two consecutive pulses.

Claim 20 discloses a sensor for the concrete embodiment of the method disclosed in claim 18. With reference to FIG. 6, the sensor may comprise those same components that are cited in the method discussed in connection with claim 18 above. Thus the sensor comprises an IR source that has been manufactured according to claim 1, and which is, among other factors, characterized by an actual and concrete thickness $d_o$ as one of its crucial specifications. In a manner corresponding to the method which the sensor is to embody, the sensor is characterized in that the IR source is operated with a definite temperature amplitude $\Delta T_1$ at a higher temperature level $T_m$ and with pulse lengths $\theta_1$ that satisfy relation (5), however, in which $\Delta T_1$ as well as $T_m$ and $\theta_1$ may have been subject to the eventual optimization that is disclosed in claim 18 as a part of adapting the method to the actual measurement task. The method disclosed in claim 18 thus serves to define the operational parameters for that particular IR source which is included in the sensor disclosed in claim 20, and thereby to define the necessary conditions that enables the sensor to perform those measurement tasks that are to be solved.

In claim 21 a sensor has been disclosed in accordance with claim 20, which in addition embodies the method disclosed in claim 19. The sensor is adapted to comprise equipment for "box-car" integration of signals inside the said time intervals $\Gamma_1$ and $\Gamma_2$, and to register or calculate the difference between those integrated signals as a measure of the amount of IR radiation that illuminates each single detector through the said volume of gas. A unique, exponential relation exists, between the relative amounts of radiation that reach a detector and the amounts of gas present in the volume, from which the gas density can be derived with known methods.

As spectrally selective elements, claim 21 discloses one or more infrared narrow-band filters to be used, adapted to the gases in question. These are standard industrial components that are easily available, and which are applied as a matter of rutine and in large numbers for similar purposes within the prior art. The filters may in principle be situated anywhere between the source and the detector. At least one filter is required for each gas to be measured; in addition, it is advantageous to employ at least one extra filter that does not coincide with the spectra of any of the gases that may be present. Said extra filters are used to establish a zero reference for the measurements, in regard to external factors other than gas and which may be assumed to influence all spectral measurements to the same extent, as for example dust accumulation on lenses and windows.

Another way to establish spectral selection is by means of a dispersive element, as for instance a prism or an optical grating. These, too, are standard components within IR technology. Claim 23 discloses the use of one or more such dispersive elements, including a spherical infrared-optical grating. The latter alternative is illustrated in FIG. 7, where one or more IR sources 71 illuminate a detector 72 through a narrow slit or aperture 73 via a spherical grating 74. The advantage gained by this is that the spherical grating also serves in a manner resemblant of a lens, to focus the radiation from the IR sources onto the detector. The physical width of the aperture may then be adapted to the spectral width of the gas spectra with high accuracy, and often far better than with narrow-band filters. Moreover, different spectral components shall pass through the aperture, depending on the position of each IR source relative to the grating. However, dispersive elements tend to be considerably more expensive than spectral filters, and so may be mostly relevant for more costly multigas sensors.

Claim 24 discloses a sensor in which one or more IR sources illuminate two or more IR detectors. For example, one IR source may illuminate two detectors simultaneously, each of the detectors being equipped with its own IR filter for gas measurement and reference purposes, respectively. This may be a relevant solution for a simple and inexpensive single-gas sensor with reference measurement. Other combinations comprising several sources and/or detectors may be of interest, too, for special purposes.

In claim 25 a sensor is disclosed in which a single detector is illuminated by several IR sources, which are pulsed at different times. One then has the opportunity of time multiplexing the spectral signals, in such a way that the position in time for each pulse uniquely defines its spectral contents. This may happen, for instance, by placing the IR filters close to the IR sources. Most elegantly, however, time multiplexing may be executed by means of a spherical grating as illustrated in FIG. 7, in which the slit 73 has been placed in one focal point of the grating and the IR sources 71 are situated along a focal line on the other side of the grating. Each IR source then illuminates the detector with its own distinct spectral IR pulse at distinct times. With a common reference detector on the rear side of the IR sources, one may then also be able continuously to correct for any variations in radiation from one or more sources.

IR detectors normally are quite small, of the order of $mm^2$, so that most often optics will be required to collect a sufficient amount of radiation from the IR source. As has already been mentioned above, with the present invention it will be possible to make large IR sources, that may be pulsed as quickly and as often as small sources. With only a short distance to the IR source, the detector thus shall see the source at a relatively large solid angle. Even without optics, the detector may then intercept enough radiation for the measurements to be made. The optical arrangements that are mentioned in claims 18 and 20 then may simply consist of free and unobstructed propagation through the gas volume. Claim 26 discloses a sensor that is made in this way. It may very easily be adapted to employ several detectors for one and the same source. When it comes to measurements of larger gas densities, which require short paths through the gas volume, designs according to claim 26 may come to be preferred; this will make the sensor particularly robust against mechanical faults and misalignments in the mounting of components during production.

The best IR detectors are made from semiconductor materials, and often need cooling to reach low noise conditions. Therefore they become as a rule also rather expensive; indeed, the IR detector is quite often the most costly single component in an IR sensor. In particular when using modulated IR sources, it has been necessary to employ such good detectors due to the minute IR signals. The large signals that are obtained with the present invention, however, enable the use of far simpler and inexpensive detectors. Among these, thermopile detectors—essentially a row of thermocouples connected in series—are particularly interesting. They are cheap and simple, but have low sensitivities and higher noise levels compared with the semiconductor detectors. On the other hand, they have no 1/f noise, because they are pure voltage generators. This enables them to be used at low frequencies without thereby increasing the noise. Therefore, thermopile detectors are ideally suited in sensors that apply the present IR sources, which according to the analysis presented above may appropriately be pulsed with relatively long pulses at correspondingly low frequencies. Claim 27 thus discloses the use of thermopile detectors in sensors according to the invention. For simple, single gas sensors in particular, the use of such detectors may make the sensors sufficiently inexpensive to open up new and large markets for IR measurement and warning of gas.

From the outset, the sensors are arranged to execute the measurements in a single IR pulse, which has been adapted to the technical demands of the task in accordance with claims 18–21. In several contexts, particularly when there are no high demands on time resolution but when the accuracy and sensitivity of measurements become important, it may be an additional advantage to sum the signals over several pulses from one and the same detector, as disclosed in claim 28. This improves the S/N ratio, and may, e.g., be relevant in measurements of many pollutant gases in ambient air indoors and outdoors, whose relative abundances are a question of millionths (ppm) or less.

Carbon monoxide is a colourless and odourless gas, which accompanies incomplete combustion in gas ovens as well as in fires. For instance, fire casulties normally die from carbon monoxide poisoning long before the fire is fully developed. Measurement of carbon monoxide thus may lead to improved warnings of fires as well as poisonous gas, and it is recognized in those trades that such needs do exist. Because of their complexity and price, however, IR sensors have not so far been applied to said purposes in any large scale, while other kinds of gas sensors have not been regarded as sufficiently reliable. The actual gas densities that must be measured and warned of, are, in both cases, a matter of the order of 100 ppm. This is within reach of the present sensors. Claim 29 discloses the detection and warning of carbon monoxide for the said purposes as a relevant and timely application. The challenge shall be to make the sensors sufficiently inexpensive, so as to compete with existing technology based on quite different technical principles of measurement.

Medicine and physiology constitute a large and important application area for gas measurements. Traditionally this concerns in particular the measurement of carbon dioxide in exhalation, which provides information about energy consumption in the body. This is of interest for patients and athletes, and for large fractions of the population in general. Measurement of gas in exhalation, however, may also be used in diagnosis, in that special gases may be produced in the body in connection with certain diseases; for instance, aceton is released in diabetes. Existing equipment is complex and expensive, and often requires long times for each measurement because exhaled gas is collected in large bags for subsequent analysis. Sensors according to the present invention make it feasible to develop more economic and simpler equipment, to be used both on people and animals. As disclosed in claim 30, a sensor may be mounted in front of the mouth orifice, ideally as a stand-alone unit but alternatively also as a component in some larger instrumentation comprising hoses and other devices. In addition to establish spectral reference readings as might be required, measurements on the inspiration air also provides a zero level reference once per respiration cycle in relation to gas exhaled from the lungs. Moreover, the time between two consecutive inspirations or exhalations may provide a simple measure for the respiration frequency, which may in many circumstances be useful to assist in calculating the exhaled volume of gas, since the IR measurement itself measures only the gas density. An interesting variant of the said application thus would be a sensor to be used for athletes (and animals!) to monitor the carbon dioxide exhaled during exercise, with the option of optimizing and improving the efficiency of techniques and energy expenditure.

What is claimed is:

1. A pulsed, radiation-cooled thermal infrared radiation source comprising at least one electrically conductive element made from a thin, foil-shaped material which is partially or wholly adapted to be heated from a lower temperature level $T_o$ to a certain higher temperature level $T_m$ that is maintained for a time period of duration $\theta$ by means of a pulse of electric current and to be pulse-wise cooled after each of said current pulse by means of thermal radiation, and electrical means arranged to supply energy to said electrically conductive element in the form of said pulse of electric current, characterized in that the thickness of those parts of said electrically conductive element which are partially or wholly adapted to be heated to said higher temperature level $T_m$ satisfies the relation $$d < 2\epsilon\sigma\theta T_m^4/C\rho\Delta T,$$

in which $\sigma = 5.67 \cdot 10^{-12}$ W cm$^{-2}$K$^{-4}$ is the Stefan-Boltzmann constant, $\Delta T = T_m - T_o$ is the difference between said higher and said lower temperature levels and $\epsilon < 1$ is the emissivity, $\rho$ is the density and C is the specific thermal capacity of said foil-shaped material, and where the sign < means "less than".

2. An infrared radiation source according to claim 1, characterized in that said electrically conductive element is mounted as a curve-shaped bridge between two fastening arrangements which may also serve as electrical contacts.

3. An infrared radiation source according to claim 1, characterized in that said electrically conductive element has a width which is larger near the ends of the filament and which has a tapering shape towards the middle of those parts of the element that are adapted to be heated to said higher temperature level.

4. An infrared radiation source according to claim 1, characterized in that said foil-shaped material is selected as at least one of the group consisting of metals, metallic alloys, ceramic materials, semiconducting materials and carbon-based materials, where the metallic alloys comprise iron, nickel, chromium, molybdenum, aluminium, cobalt, titanium and/or metallic glasses, and where the carbon-based materials include fullerenes and materials consisting of at least one diamond-like network.

5. An infrared radiation source according to claim 1, characterized in that said electrically conductive element has a thickness which is larger near the ends of the filament and which decreases towards the middle of those parts of the element that are adapted to be heated to said higher temperature level.

6. An infrared radiation source according to claim 1, characterized in that the surface of said foil-shaped material is selected as one of the group consisting of porous materials and materials having a textured, microscopic depth structure.

7. An infrared radiation source according to claim 1, characterized in that said electrically conductive element/elements is/are mounted in an hermetically closed encapsulation devoid of reactive gases and comprising at least one infrared-transmitting window adapted to at least one of opposite faces of said element/elements, and with electrical feed-throughs for the supply of said pulses of electric current to said electrically conductive element/elements.

8. An infrared radiation source according to claim 2, characterized in that said electrically conductive element has a width which is larger near the ends of the filament and which has a tapering shape towards the middle of those parts of the element that are adapted to be heated to said higher temperature level.

9. An infrared radiation source according to claim 2, characterized in that said foil-shaped material is selected as at least one of the group consisting of metals, metallic alloys, ceramic materials, semiconducting materials and carbon-based materials, where the metallic alloys comprise iron, nickel, chromium, molybdenum, aluminium, cobalt, titanium and/or metallic glasses, and where the carbon-based materials include fullerenes and materials consisting of at least one diamond-like network.

10. An infrared radiation source according to claim 2, characterized in that the surface of said foil-shaped material is selected as one of the group consisting of porous materials and materials having a textured, microscopic depth structure.

11. An infrared radiation source according to claim 2, characterized in that said electrically conductive element/elements is/are mounted in an hermetically closed encapsulation devoid of reactive gases and comprising at least one infrared-transmitting window adapted to at least one of opposite faces of said element/elements, and with electrical feed-throughs for the supply of said pulses of electric current to said electrically conductive element/elements.

12. Infrared radiation source according to claim 1, characterized in that said electrical means are arranged to supply electrical energy to said electrically conducting element/elements by means of pulses of electric current each one of which comprises a first part preferably having a strong amperage adapted to heat said element(s) to said higher temperature level $T_m$ and a second part preferably having a weaker and constant amperage adapted to maintain said element(s) at the said temperature level $T_m$ for a period of time with said duration $\theta$.

* * * * *

UNITED STATES PATENT AND TRADEMARK OFFICE
CERTIFICATE OF CORRECTION

PATENT NO. : 6,540,690 B1
DATED : April 1, 2003
INVENTOR(S) : Svein Otto Kanstad It is certified that error appears in the above-identified patent and that said Letters Patent is hereby corrected as shown below:

Column 11,
Line 48, delete "$d<2\varepsilon\sigma\theta T_{m4}/C\rho\Delta T$" and insert therefor -- $d<2\varepsilon\sigma\theta T_m^4/C\rho\Delta T$ --

Signed and Sealed this

Ninth Day of September, 2003

JAMES E. ROGAN
*Director of the United States Patent and Trademark Office*